United States Patent
Alzner et al.

(10) Patent No.: US 7,259,385 B2
(45) Date of Patent: *Aug. 21, 2007

(54) PHOTO-STIMULABLE IMAGE PLATE RESTORATION ASSEMBLY

(75) Inventors: Edgar Alzner, Garden City, NY (US); Stephen Zamprelli, Bardonia, NY (US); Eddy Paultre, West Hempstead, NY (US); Walter Gross, Massapequa, NY (US)

(73) Assignee: Air Techniques, Inc., Melville, NY (US)

( * ) Notice: Subject to any disclaimer, the term of this patent is extended or adjusted under 35 U.S.C. 154(b) by 229 days.

This patent is subject to a terminal disclaimer.

(21) Appl. No.: 11/155,365

(22) Filed: Jun. 20, 2005

(65) Prior Publication Data

US 2006/0284125 A1    Dec. 21, 2006

Related U.S. Application Data

(63) Continuation-in-part of application No. 10/356,204, filed on Jan. 31, 2003, now Pat. No. 7,061,003.

(51) Int. Cl.
*G01N 23/04* (2006.01)

(52) U.S. Cl. .................. 250/588; 250/581; 250/580

(58) Field of Classification Search ................ 250/588, 250/581, 580
See application file for complete search history.

(56) References Cited

U.S. PATENT DOCUMENTS

| 4,752,687 | A | * | 6/1988 | Yamada | 250/588 |
| 4,902,023 | A | * | 2/1990 | Opresko et al. | 277/628 |
| 5,276,333 | A | * | 1/1994 | Robertson | 250/484.4 |
| 6,140,663 | A | * | 10/2000 | Neary et al. | 250/588 |
| 6,191,426 | B1 | * | 2/2001 | Hayakawa et al. | 250/484.4 |
| 6,815,703 | B2 | * | 11/2004 | Iwakiri | 250/588 |

* cited by examiner

*Primary Examiner*—David Porta
*Assistant Examiner*—Christine Sung
(74) *Attorney, Agent, or Firm*—Clifford G. Frayne; Louis E. Marn

(57) ABSTRACT

An erasure assembly for imaging plates comprised of a cover member and a base member, the cover member in the form of an inverted rectangular tray having a plurality of light sources and reflective sources mounted therein behind a diffuser glass member, the base member, complimentary with the cover member having a support area for the placement of imaging plates on their non-reactive surface, their photo-stimulable surface facing upwardly, the cover member closed upon the base member and there being a control means to activate the light sources for a time sufficient to erase the retained images on the photo-stimulable surface of the image plates.

10 Claims, 6 Drawing Sheets

PHOTO-STIMULABLE IMAGE PLATE RESTORATION ASSEMBLY

RELATED APPLICATIONS

This application is a continuation-in-part application of application Ser. No. 10/356,204, filed Jan. 31, 2003, now U.S. Pat. No. 7,061,003, which is incorporated herein.

BACKGROUND OF THE INVENTION

1. Field of the Invention

The present invention relates to digital medical and/or dental imaging systems which utilize reusable photo-stimulable phosphor (PSP) imaging plates, and more particularly, to a restoration assembly which erases or clears the residual information from a previous x-ray exposure prior to reuse of the imaging plate.

2. Description of the Prior Art

Photo-stimulable phosphor (PSP) imaging plates record an image as a result of x-ray exposure. The exposed imaging plate is then scanned or read by a scanner which digitally stores the image in a computer processing unit. Since the imaging plates are reusable, the residual information must be erased from the imaging plate before it is reused. There are automatic imaging systems available wherein the imaging plates are not manually handled and these systems perform this erasure function internally.

However, there are many systems that require manual handling of the imaging plates such as those associated in the dental arts with dental scanners or image readers. In these systems, the user must expose the imaging plates to a light source of a known power for a sufficient length of time so that the total energy per unit area has adequately erased or deleted the previous residual image data. Typically an erasure of 95.5 percent is sought. Such erasing in a manual system requires a 60,000 LUX-second of fluorescent light for intraoral imaging plates and double that amount for extraoral imaging plates. If incandescent light is utilized, the erasure requires 120,000 LUX-second of incandescent for intraoral imaging plates and twice that amount for extraoral imaging plates. Other arguments by physicists have indicated that energy of as much as 750,000 Lux-sec is required for adequate or acceptable erasing of such image plates.

The existing technology associated with the manual handling of the image plates recommends the placing of the imaging plates face down on the horizontal surface of a view box or clipped to the vertical surface of a wall mounted view box. The lowest measured light intensity at any given point on the view box would determine the amount of time required for restoration by dividing the exposure requirement by this intensity.

This existing procedure introduces several factors which adversely affect imaging plates. The surface of the view box may be dusty or have particulate matter adhering thereto which in turn adheres to the image surface of the imaging plate and thereby possibly degrading subsequent images. Still further in positioning the imaging plate on the view box and removing it from the view box, the imaging surface of the imaging plate may be scratched leading to premature degradation and may affect any subsequent exposure images. Still further there may be surface imperfections on the view box which will cause shadows on the imaging plate thereby not allowing complete erasure of the plates at these locations. Additionally, manipulating the plates on such surfaces invariably cause the users to touch the imaging surface of the imaging plate leading to the deposit of body oils and acids on the sensitive surface which further prematurely degrades the plates useful life and affect any subsequent images. Finally, since light sources decrease unpredictably in their light emitting intensity with time, the light box emitting light intensity must be monitored regularly to assure adequate erasure or else excessive erasure time must be given.

OBJECTS OF THE INVENTION

An object of the present invention is to provide for a novel restoration assembly in the form of an imaging plate holder for exposure to fluorescent or incandescent light for the erasing of residual images thereon.

Another object of the present invention is to provide for a novel restoration assembly for imaging plates which position such imaging plates for erasure without causing contact to the imaging surface of the imaging plate.

A still further object of the present invention is to provide for a novel restoration assembly for imaging plates which allows for the placement and removal of the imaging plates along their edges and eliminating imaging surface contamination by body oils or acids.

A still further object of the present invention is to provide for a novel restoration assembly in which the imaging surface of the imaging plate is positioned for erasure without having to contact the surface of the light box.

A still further object of the present invention is to provide for a novel restoration assembly which can accommodate all sizes of intra-oral image plates, extra-oral image plates and certain sizes of medical imaging plates.

A still further object of the present invention is to provide for a novel restoration assembly erasing in a short period of time, in an automatically timed short period of time and measuring the intensity of the erasing lamps to alert the user to degradation of light intensity.

A still further object of the present invention is to provide a novel restoration assembly which supports a plurality of imaging plates of varying sizes at discrete locations on non-reacting surfaces of the imaging plates.

SUMMARY OF THE INVENTION

A restoration assembly for imaging plates comprised of a cover member and a base member, the cover member in the form of an inverted rectangular tray having a plurality of light sources and reflective sources mounted therein behind a diffuser glass member, the base member, complimentary with the cover member having a support area for the placement of imaging plates on their non-reactive surface, their photostimulable surface facing upwardly, the cover member closed upon the base member and there being a control means to activate the light sources for a time sufficient to erase the retained images on the photostimulable surface of the image plates. The support area within the base member is formed with a plurality of parallel channels providing a surface with alternating stepped crests and troughs such that the imaging plates can be positioned on the crest and trough steps and slightly apart allowing the user to engage the imaging plates about along the edges and avoid contaminating the photostimulable surface.

BRIEF DESCRIPTION OF THE DRAWINGS

These and other objects of the present invention will become apparent particularly when taken in light of the following illustrations wherein.

DETAILED DESCRIPTION OF THE DRAWINGS

Figure 1:
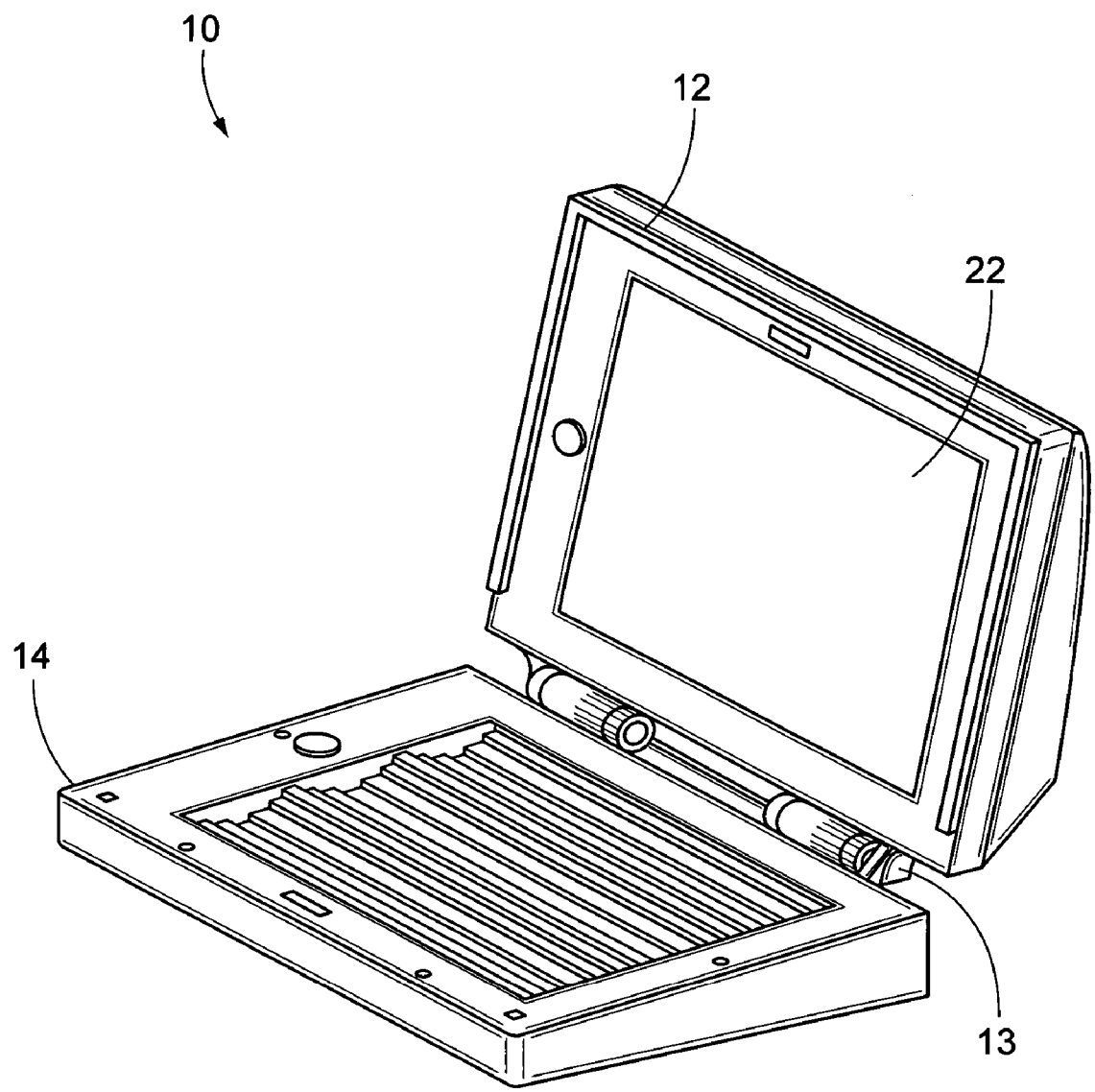
FIG. 1 is a perspective view of the restoration assembly of the present invention illustrated in an open orientation.
Figure 2:
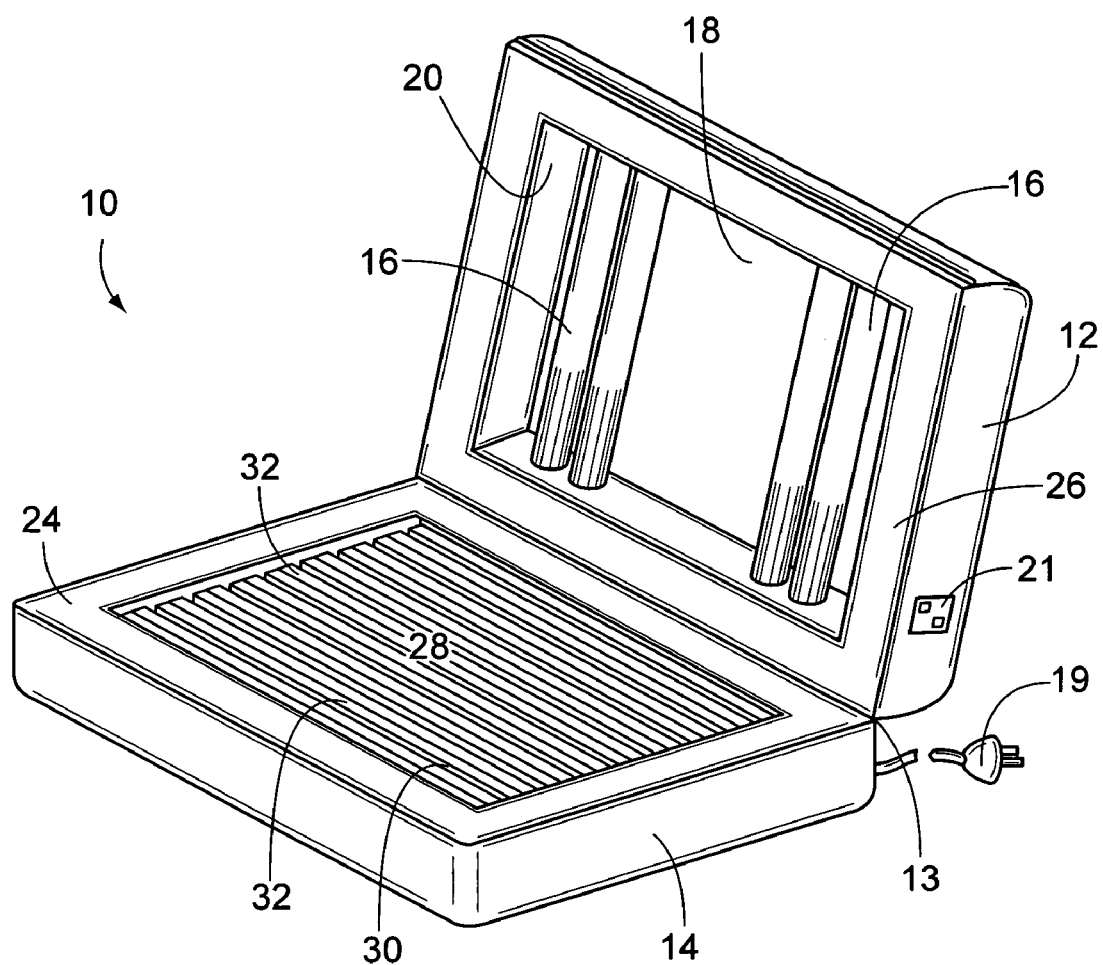
FIG. 2 is a perspective view of the restoration assembly of the present invention with the diffuser panel removed illustrating the light source.

FIG. 1 is a perspective view of the restoration assembly of the present invention in an open position and FIG. 2 is a perspective view of the restoration assembly with the diffuser plate removed to facilitate a view of the light source. The restoration assembly 10 is comprised of a cover member 12 and a base member 14. In the embodiment illustrated in FIG. 1, these members are hingeably engaged along one peripheral edge 13, however, they could be two separate members which interlock. Cover member 12 and base member 14 are complimentary in their cross sectional area with cover member 12 resembling an inverted tray in which a light source 16 and appropriate reflective members 18 are positioned, light source 16 being in communication with a power source 19 by way of control panel 21. Light source 16 and reflective members 18 are recessed within a cavity 20 which cavity is overlaid with a transparent diffuser glass 22.

Base member 14 has a periphery 24 cooperative with the periphery 26 of cover member 12. Contained within the periphery 24 of base member 14 is a support surface 28 for imaging plates. In the embodiment illustrated, the support surface 28 comprises a series of alternating crests and troughs identified generally as 30 and 32 from the front to the rear of the assembly, but could also alternate from one side edge to the opposing side edge. The distance between adjacent crests 30, or the width of the trough 32 is such so that the restoration assembly 10 can accommodate the various film sizes 0-4 of intra oral and panoramic imaging plates.

Figure 3:
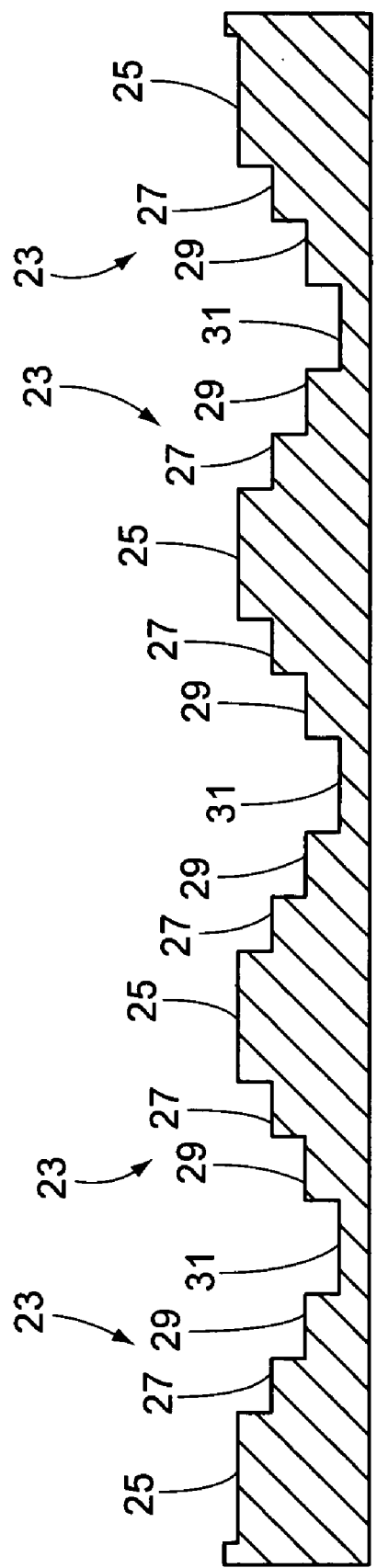
FIG. 3 is a cross sectional view of the support surface of the restoration assembly illustrated in FIG. 1.

FIG. 3 is a cross section of support surface 28. The faces of the crests and troughs are stepped 23 thereby defining a plurality of parallel planar support surfaces 25, 27, and 29 on each crest and trough, planar surfaces 25, 27 and 29 on each adjacent crest and trough being at the same planar level. The lowest trough level 31 allows the users fingers to place and remove photostimulable phosphor imaging plate located on parallel planar surfaces 29 by inserting the users fingers into the trough area defined by level 31 and adjacent steps 29, so as to grasp the imaging plate by the edges. The planar surfaces 25, 27, and 29 allow the user to position the imaging plates by holding them by the edges and thus insuring no contamination of the photo-stimulable surface by body oils or acids. In grasping the imaging plates by the edges, the user can place the imaging plates non-reactive side facing down on the appropriate planar surfaces 25, 27, or 29 depending on the size of the imaging plate.

When the quantity of imaging plates to be erased are positioned on the parallel planar surfaces 25, 27, and 29, cover 12 would be closed and the light source activated. The height of support surface 28 within base member 14 is such that when the cover 12 is closed, there is a gap of approximately at least ⅛th of an inch between the crests 30 and the diffuser glass 22, thus insuring no contact with the photo-stimulable surface of the imaging plate. It should be noted that the restoration assembly 10 illustrated in FIG. 1 can also be dimensioned to handle extra oral imaging plates and medical imaging plates. The support surface 28 is preferably constructed of a white or silver reflective material which is non-porous and can be removed and cleaned as necessary, the reflectivity improving the erasing and decreasing the erasing time. In the embodiment illustrated, which is for dental imaging plates, the area of illumination (i.e. the dimension of the diffuser glass 22) would preferably be 8 inches by 12 inches. However, a restoration assembly 10 of the present invention utilized for medical size imaging plates could be larger.

Figure 4:
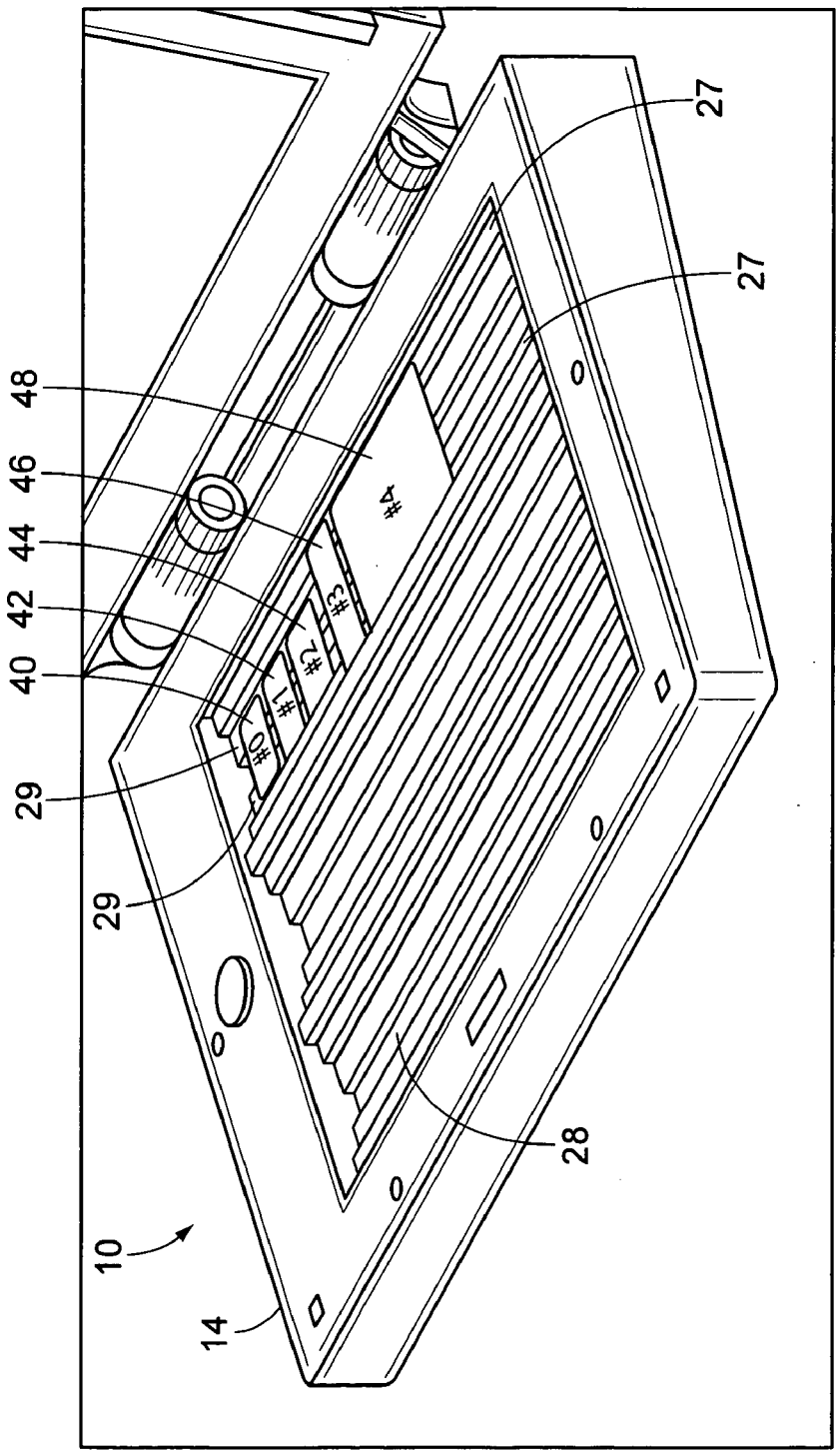
FIG. 4 is a perspective view of the support surface of the restoration assembly of FIG. 1 illustrating the manner in which the restoration assembly can accommodate the five normal sizes of intraoral photo-stimulable phosphor imaging plates.
Figure 5:
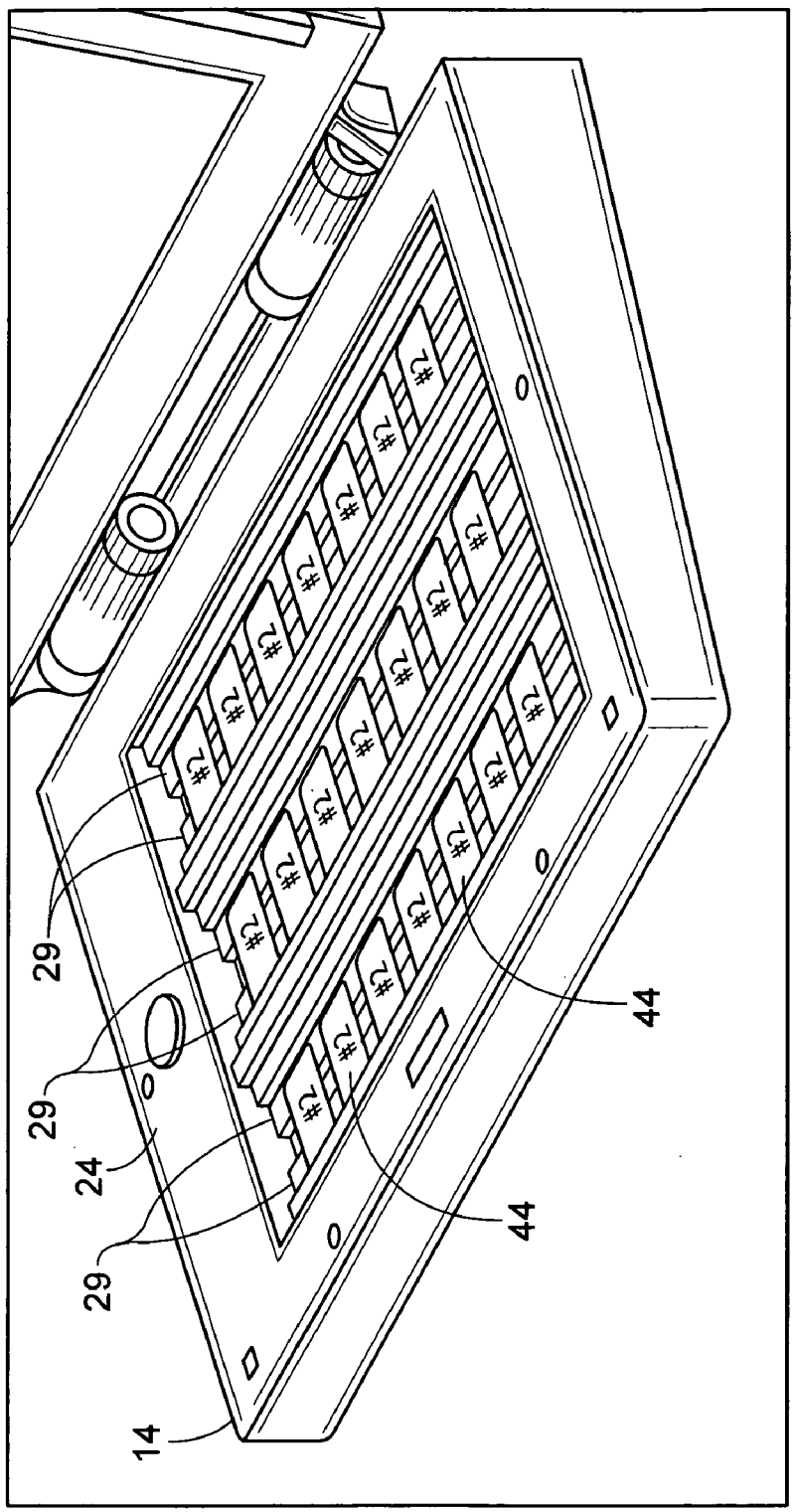
FIG. 5 is a perspective view of the support surface of the restoration assembly of FIG. 1 illustrating the manner in which the support surface can support a plurality of number 2 size photo-stimulable phosphor imaging plates.
Figure 6:
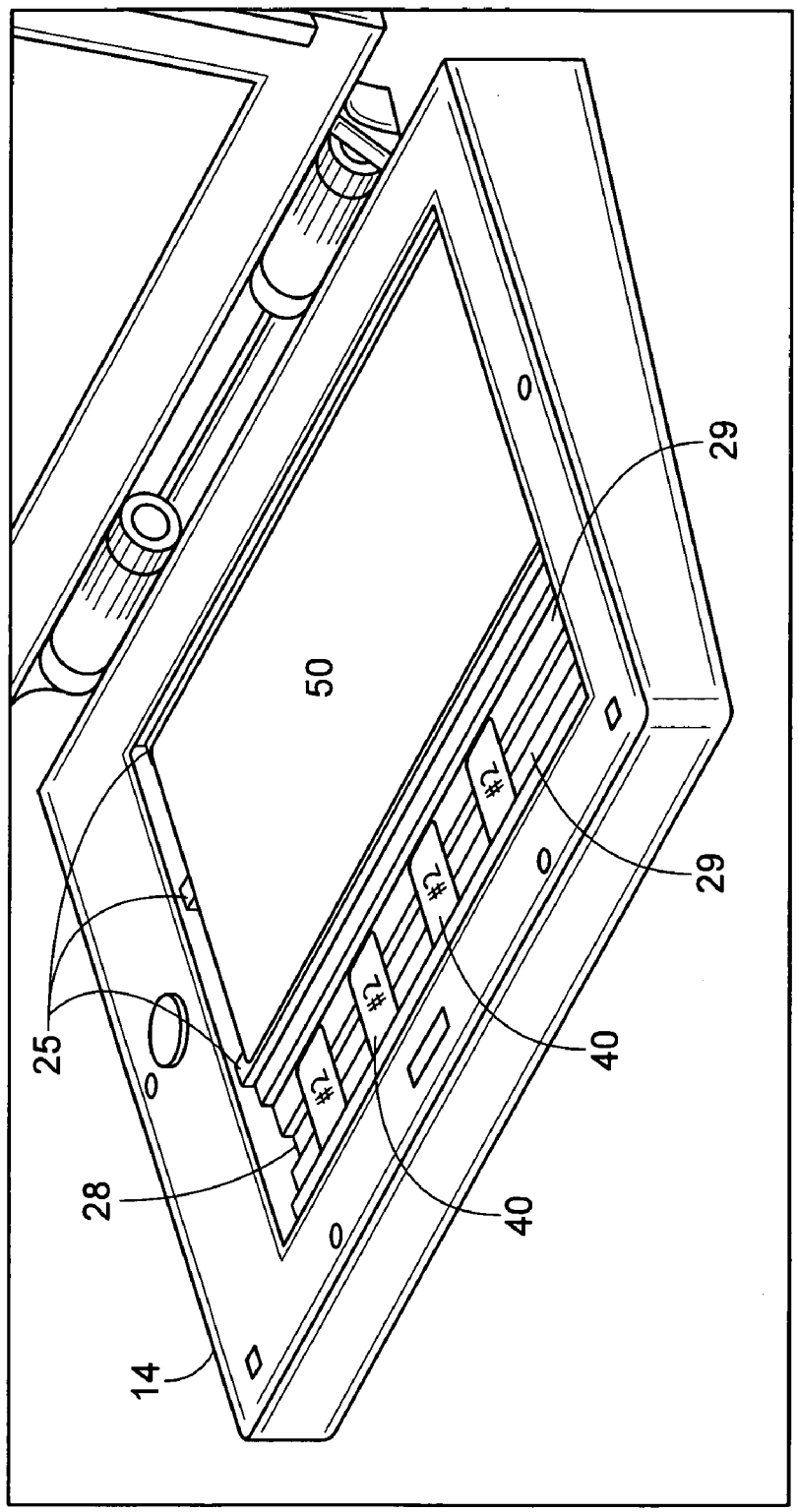
FIG. 6 is a perspective view of the support surface illustrating one manner in which the support surface can support a panoramic photo-stimulable phosphor imaging plate and a plurality of smaller size photo-stimulable phosphor imaging plates.

FIGS. 4, 5, and 6 are perspective views of support surface 28 illustrating a variety of arrangements of photostimulable phosphor imaging plates of various sizes. Photostimulable phosphor imaging plates used intraorally are sized 0, 1, 2, and 3. As FIG. 4 illustrates, the placement of a size 0 photostimulable phosphor imaging plate 40 positioned on a pair of parallel planar support surfaces 29. Similarly a size 1 photostimulable phosphor imaging plate 42 is positioned on parallel planar support surfaces 29 as is a size 2 photostimulable phosphor imaging plate 44. A size 3 photostimulable phosphor imaging plate 46 is positioned between parallel planar support surfaces 27. An extraoral photostimulable phosphor imaging plate size 4, 48, is illustrating being supported between parallel planar support surfaces 27. One trough arrangement 32 can therefore accommodate 5 different sizes of photostimulable phosphor imaging plates in any combination.

FIG. 5 illustrates the support surface 28 accommodating a plurality of size 2 intraoral photostimulable phosphor imaging plates 44 on support surface 29. These size 2 intraoral photostimulable phosphor imaging plates 44 are positioned in all of the three defined trough areas 32 of upper surface 28.

FIG. 6 illustrates support surface 28 accommodating a plurality of size 2 photostimulable phosphor imaging plates 40 in one trough area 32 and a panoramic photostimulable phosphor imaging plate 50 being accommodated on adjacent planar upper surfaces 25 defining the top surface of three adjacent crest areas 30. The novel design and structure of support surface 28 allows the user a great deal of selection in the arrangement of photostimulable phosphor imaging plates of various sizes in order that the latent image contained thereon can be erased in an efficient manner.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

We claim:

1. A restoration assembly for photo-stimulable phosphor imaging plates, which comprises:

a cover member having a cavity defined by a peripheral surface portion;

a light source disposed in said cavity of said cover member;

light reflective means disposed in said cavity between said cover member and said light source;

a diffuser glass member positioned over said light source means;

a base member having a cavity defined by a peripheral surface portion for cooperating with said peripheral surface portion of said cover member upon positioning of said cover member on said base member;

support means disposed in said cavity of said base member for positioning imaging plates thereon by grasping side edge portions of said imaging plates with imaging sides thereof facing upwardly from said positioning means, said support means being spaced apart from said diffuser glass member of said cover member during restoration protocol, said support means for said imaging plates is formed of a series of crests and troughs, said crests and troughs being stepped forming spaced apart longitudinal planar platforms for support of the nonreactive side of said imaging plates; and control means for activating said light source to regenerating imaging capability of said thus positioned imaging plates.

2. The restoration assembly as defined in claim 1 wherein said cover member and base member are hingeable mounted to each other with said peripheral surfaces portions thereof being in contacting relationship during said restoration protocol.

3. The restoration assembly as defined in claim 1 wherein said base member is slidably positioned within said cover member with said peripheral surfaces portions thereof being in contacting relationship during said restoration protocol.

4. The restoration assembly as defined in claim 1 wherein said support means for said imaging plates is formed of a reflective nonporous material.

5. A restoration assembly for restoring imaging capability of a photo-stimulable phosphor imaging plate, which comprises:

a base member having an imaging plate support member formed with a Vshaped channel of a stepped side wall configuration having supporting surfaces for an imaging plate; and a cover member including light sources having an energy level sufficient to remove residual latent images in a previously exposed imaging plate.

6. The restoration assembly for restoring imaging capability of a photo-stimulable phosphor imaging plate as defined in claim 5 wherein said V-shaped channels include cooperating pairs of horizontally-disposed surface portions for receiving a previously exposed imaging plate.

7. The restoration assembly for restoring imaging capability of a photo-stimulable phosphor imaging plate as defined in claim 6 including a base surface portion disposed between lower paired horizontally-disposed surface portions.

8. The restoration assembly for restoring imaging capability of a photo-stimulable phosphor imaging plate as defined in claim 6 wherein said V-shaped channels are formed with an upper horizontally-disposed surfaces there between.

9. The restorations assembly for restoring imaging capability of a photo-stimulable phosphor imaging plate as defined in claim 6 wherein there are a lower paired cooperating surface portions and an upper paired cooperating surface portions wherein said lower paired cooperating surface portions is dimensioned to receive smaller imaging plates and said upper paired cooperating surface portions is dimensioned to receive larger imaging plates.

10. The restoration assembly for restoring imaging capability of a photo-stimulable phosphor plate as defined in claim 8 wherein said upper surface portions between channels permit positioning of imaging plates of a dimension larger than dimensions of said paired cooperating surface portions.

* * * * *